United States Patent [19]

Rhodes et al.

[11] 4,098,612

[45] Jul. 4, 1978

[54] TRANSPARENT YTTRIA CERAMICS AND METHOD FOR PRODUCING SAME

[75] Inventors: William H. Rhodes, Lexington; F. Joseph Reid, Acton, both of Mass.

[73] Assignee: GTE Laboratories Incorporated, Waltham, Mass.

[21] Appl. No.: 814,342

[22] Filed: Jul. 11, 1977

[51] Int. Cl.$^2$ ............................................. C04B 35/50
[52] U.S. Cl. ................................................. 106/73.2
[58] Field of Search ............................. 106/39.5, 73.2

[56] References Cited

U.S. PATENT DOCUMENTS

| | | | |
|---|---|---|---|
| 3,545,987 | 12/1970 | Anderson | 106/39.5 |
| 3,719,550 | 3/1973 | Arendt | 106/73.2 |
| 3,764,643 | 10/1973 | Muta et al. | 106/39.5 |
| 3,897,358 | 7/1975 | Greskovich et al. | 106/39.5 |

*Primary Examiner*—J. Poer
*Attorney, Agent, or Firm*—David M. Keay

[57] ABSTRACT

An article of manufacture is provided comprising a substantially transparent high density polycrystalline yttria-base body consisting essentially of yttria and from about 0.01 to 5 wt. % alumina.

A method for preparing the transparent yttria doped with alumina is also provided comprising admixing alumina or a precursor thereof with yttria or a precursor thereof, drying the admixed powders, calcining the admixed powders and pressing the calcined powders into a desired shape and thereafter sintering the shaped powder for about ¼ to 6 hours at a temperature above the eutectic temperature at a sufficiently low oxygen atmosphere to prevent oxidative contaminants.

2 Claims, No Drawings

TRANSPARENT YTTRIA CERAMICS AND METHOD FOR PRODUCING SAME

BACKGROUND OF THE INVENTION

The present invention relates to transparent yttria ceramics and to methods for the preparation thereof. More particularly, this invention relates to substantially transparent, high density, polycrystalline yttria doped with alumina and to methods for the preparation thereof.

Ceramics have long been considered desirable materials for use in high temperature applications; however, ceramic materials are generally opaque and cannot be suitably employed where light transmission is desired.

Efforts have heretofore been made to obtain transparent ceramics especially for high temperature lamp envelope applications. Recently, transparent yttria-based materials have been developed. For example, U.S. Pat. No. 3,545,987 discloses a high density, yttria-based polycrystalline ceramic containing from about 2 to 15 mole % of an oxide selected from the group consisting of thoria, zirconia, hafnia or combinations thereof. It has been found, however, that in such materials anion interstitials are formed which are unstable in the low-oxygen pressure, high temperature environment of a high-pressure sodium lamp. Consequently, high-pressure sodium lamps having envelopes formed from such materials have been found to be unsatisfactory since they darken rendering the envelope opaque after a few hours of use.

U.S. Pat. No. 3,878,280 describes a method for the preparation of transparent yttria without the use of additives by use of a vacuum hot pressing operation. This technique is not amenable, however, to the production of thin-wall lamp envelope tubing due to the high pressure gradients along the length of the tube. Consequently, hot pressing is not currently considered a viable process for the formation of transparent polycrystalline tubes.

U.S. Pat. No. 3,873,657 describes the preparation of transparent yttria by employing beryllium compounds as a sintering aid. The beryllium compounds employed, however, are toxic; consequently, utilization of such materials in commercial manufacturing operations would be severely handicapped and even perhaps prevented by governmental regulations.

SUMMARY OF THE INVENTION

Accordingly, it is an object of the present invention to overcome the disadvantages of the prior art and to provide a substantially transparent yttrium oxide with excellent light transmitting properties. It is another object to provide a method for economically and non-toxically fabricating such transparent yttria envelopes which are stable in the environment of a high-pressure sodium lamp.

These as well as other objects are accomplished by the present invention which, in one embodiment, provides an article of manufacture comprising a substantially transparent, high density, polycrystalline yttria-based body consisting essentially of yttria ($Y_2O_3$) and containing from about 0.01 to 5 wt. % alumina ($Al_2O_3$).

The present invention makes use of the increased thermodynamic stability of yttria ($Y_2O_3$) over yttria doped with +4 valence ions, e.g. $Th^{+4}$. Yttria, when doped with thoria, darkens between 1200°–1400° C in the sodium vapor environment (an oxygen pressure of $10^{-7}$ atmospheres). It has now been found that if alumina ($Al_2O_3$) is employed as a sintering aid, yttria can be sintered to transparency without significantly reducing the thermodynamic stability of yttria. The eutectic temperature between the compunds $Y_4Al_2O_9$ and $Y_2O_3$ is 1920° C ± 10°. Above this temperature, a liquid phase is formed which provides a means of promoting densification by a liquid phase sintering mechanism. Such a mechanism, when employed in accordance with the process of the present invention, enhances densification and leads to the attainment of high density transparent yttria.

The transparent yttria doped with alumina in accordance with the present invention can be obtained by admixing alumina with yttria in a concentration of from about 0.01 to 5% by weight and preferably from about 0.05 to about 0.25% by weight. The alumina can be added as $Al_2O_3$ powder or any precursor thereof which is convertible to alumina under calcining or sintering conditions, e.g. $Al(NO_3)_3$ dissolved in methanol, precipitated $Al(OH)_3$ or by ball milling with $Al_2O_3$ grinding media.

The yttrium oxide ($Y_2O_3$) employed as a starting material in the present invention is preferably yttrium oxide powder of high purity. Substantially equivalent results, however, can be obtained when yttrium compounds convertible to yttrium oxide under calcining or sintering conditions are employed such as yttrium carbonate ($Y_2(CO_3)_3$) or yttrium oxalate ($Y_2(C_2O_4)_3$, with the latter source being preferred.

The powders are admixed with each other or if a liquid media is employed the liquid is thoroughly admixed with the powder until the powder is impregnated therewith. Thereafter, the resulting powders are dried, preferably at about 110° C and calcined for 1 hour at about 1000° C in air and then screened through a 100 mesh screen. The resulting powders can then be pressed to any desired shape such as a tube, disc or the like at pressures ranging from about 15,000 to 50,000 psi. The pressed article is then pre-fired in air for 1 hour at 1,000° C and is then transferred to a controlled atmosphere furnace wherein it is sintered for about ¼ to 6 hours at a temperature above the eutectic temperature, preferably at from about 2000° C to 2400° C and most preferably at about 2100° C.

Prior to sintering at a temperature above the eutectic temperature the pressed article may be sintered about 1–8 hours at a temperature below the eutectic temperature, preferably at about 1700° C to 1850° C and most preferably at about 1850° C, and subsequent to sintering at a temperature above the eutectic temperature, the pressed article may be sintered about 1 to 2 hours at a temperature at or about the eutectic temperature, at around 1875° C to 1975° C and most preferably at about 1925° C.

The optional first stage of sintering promotes maximum densification with $Y_4Al_2O_9$ as a solid second phase inhibiting grain growth. It is desirable to have as much densification as possible without pores being entrapped within grains prior to the essential second stage of sintering, that is, the sintering at above the eutectic temperature. The essential second stage is the liquid phase sintering regime where the essential removal of the last few percent of porosity and grain growth occur. The optional third stage of sintering is desirable because it is at the eutectic temperature, 1920° ± 10° C, that the maximum solubility for $Al_2O_3$ in $Y_2O_3$ exists. This stage minimizes the second phase retained in the structure which may be desirable for optimized chemical and physical properties.

The atmosphere during sintering should be at a sufficiently low oxygen pressure to prevent oxidation of the furnace elements which can give rise to contamination of the sintered body. In the case of a W mesh furnace, for example, an oxygen atmosphere less than or equal to $10^{-10}$ atmospheres at 1900° C and $2 \times 10^{-10}$ atmospheres at 2100° C has been found satisfactory. If an oxygen pressure of equal or slightly greater than $1 \times 10^{-10}$ atmospheres is employed during the last stage of the sintering cycle wherein the temperature is maintained at or about the eutectic temperature, the resultant product is substantially colorless, transparent $Y_2O_3$. If, however, the oxygen pressure is significantly less than $10^{-10}$ atmospheres, the resultant product is black; but can be easily oxidized in five hours at 1500° C in air to obtain transparent, colorless $Y_2O_3$.

The substantially transparent, high-density polycrystalline yttria doped with alumina obtained in accordance with the present invention provides an excellent shaped transparent ceramic for lamp envelope applications. These ceramics are thermodynamically more stable than yttria doped with +4 valence ions in a sodium lamp environment. The transparent ceramics of the present invention can be easily pressed and sintered forming transparent tubes and other complicated shapes. Moreover, the alumina sintering aid of the present invention is non-toxic.

DESCRIPTION OF PREFERRED EMBODIMENTS

The following examples further illustrate the present invention. It is to be understood that these examples are for illustrative purposes only and neither the spirit nor scope of this invention is to be limited thereby. Unless otherwise specified, all percentages and parts are by weight.

In the following examples density measurements were based on the Archimedes principle and performed on a Mettler analytical balance. Optical measurements on polished 1 millimeter thick disc specimens were obtained on a Cary 14 spectrophotometer. All reported values are at a wavelength of 0.6 micrometers. Total transmission of tubes was measured with a Hoffman Engineering Corp. 12 inch integrating sphere in the visible wavelength range. Specular transmissions on tubes was taken with a GTE Sylvania device which measures light transmission through both walls along a specimen diameter.

The table below summarizes the results obtained:

TABLE

| Example | Weight % $Al_2O_3$ | Source of $Al_2O_3$ | Source of $Y_2O_3$ | Sample Shape | Pressing Pressure (Ksi) | Sinter Cycle | Density (% Theoretical) | % Total* Transmission | Specular** Transmission |
|---|---|---|---|---|---|---|---|---|---|
| 1. | 0.1 | Al(NO$_3$)$_3$ | Y$_2$(C$_2$O$_4$)$_3$ | Disc | 50 | 2100° C-2¼ h | 99.3 | 57.5 | 17.0 |
| 2. | 0.69 | Al(NO$_3$)$_3$ | Y$_2$(C$_2$O$_4$)$_3$ | Disc | 50 | 2100° C-2¼ h | 99.2 | 59.3 | 5.5 |
| 3. | 0.23 | Al(NO$_3$)$_3$ | Y$_2$(C$_2$O$_4$)$_3$ | Disc | 50 | 2000° C-2¼ h | 99.5 | 59.9 | 8.3 |
| 4. | 0.028 | Al$_2$O$_3$ Milling Balls | Y$_2$(CO$_3$)$_3$ | Disc | 50 | 1900° C-2 h 2100° C-2 h | 99.7 | 60.6 | 32.0 |
| 5. | — | Al$_2$O$_3$ Milling Balls | Y$_2$(CO$_3$)$_3$ | Tube | 27 | 1650° C-1½ h 2100° C-2 h | 99.8 | 87 | 3.1 |
| 6. | 0.1 | Al(NO$_3$)$_3$ | Y$_2$(C$_2$O$_4$)$_3$ | Disc | 50 | 1850° C-5 h 2100° C-4 h 1875° C-2 h | 99.6 | 71.9 | 34.3 |
| 7. | 0.23 | Al(NO$_3$)$_3$ | Y$_2$(C$_2$O$_4$)$_3$ | Disc | 50 | 1850° C-5 h 2100° C-4 h 1875° C-2 h | 99.9 | 80.4 | 27.2 |
| 8. | 0.14 | Al(NO$_3$)$_3$ | Y$_2$(C$_2$O$_4$)$_3$ | Tube | 27 | 1850° C-5 h 2100° C-4 h 1925° C-2 h | 99.6 | 93.7 | 3.1 |
| 9. | 0.05 | Al(NO$_3$)$_3$ | Y$_2$(C$_2$O$_4$)$_3$ | Disc | 50 | 1800° C-4 h 2100° C-6 h 1925° C-2 h | 99.4 | 46 | 22 |
| 10. | 0.14 | Al(NO$_3$)$_3$ | Y$_2$(C$_2$O$_4$)$_3$ | Disc | 50 | 1800° C-4 h 2100° C-6 h 1925° C-2 h | 99.9 | 71 | 46 |
| 11. | 0.23 | Al(NO$_3$)$_3$ | Y$_2$(C$_2$O$_4$)$_3$ | Disc | 50 | 1800° C-4 h 2100° C-6 h 1925° C-2 h | 99.9 | 73 | 35 |
| 12. | 0.14 | Al(NO$_3$)$_3$ | Y$_2$(C$_2$O$_4$)$_3$ | Tube | 28 | 1850° C-5 h 2100° C-4 h 1925° C-2 h | 99.9 | 95.1 | 7 |
| 13. | 0.10 | Al(NO$_3$)$_3$ | Y$_2$(C$_2$O$_4$)$_3$ | Tube | 28 | 1850° C-4 h 2100° C-4 h 1925° C-1 h | 99.9 | 95.3 | 5.9 |
| 14. | 0.1 | Al(NO$_3$)$_3$ | Y$_2$(C$_2$O$_4$)$_3$ | Disc | 28 | 1850° C-4 h 2100° C-4 h 1925° C-1 h | 99.9 | 66 | 23 |
| 15. | 0.1 | Al(NO$_3$)$_3$ | Y$_2$(C$_2$O$_4$)$_3$ | Disc | 50 | 1850° C-5 h 2100° C-4 h 1925° C-2 h | 99.7 | 65 | 32 |

*Reflection losses reduce theoretical transmission to 81.3% for disc specimen.
**Pseudo specular transmission of tubes was along diameter and thru two walls.

While there has been shown and described what is at present considered the preferred embodiment(s) of the invention, it will be obvious to those skilled in the art that various changes and modifications may be made therein without departing from the scope of the invention as defined by the appended claims.

What is claimed is:

1. An article of manufacture comprising a substantially transparent, high density polycrystalline yttria-based body consisting essentially of yttria and from about 0.01 to 5 wt. % alumina.

2. An article of manufacture as defined in claim 1 containing from about 0.05 to 0.25 wt. % alumina.

* * * * *